United States Patent [19]
Cooper

[11] Patent Number: 5,186,694
[45] Date of Patent: Feb. 16, 1993

[54] DIFFERENTIAL ASSEMBLY

[75] Inventor: John E. Cooper, Stoke-on-trent, England

[73] Assignee: Rolls-Royce Motor Cars Limited, Cheshire, England

[21] Appl. No.: 742,311

[22] Filed: Aug. 8, 1991

[30] Foreign Application Priority Data

Aug. 15, 1990 [GB] United Kingdom ................ 9017927

[51] Int. Cl.$^5$ ............................................... F16H 1/40
[52] U.S. Cl. ..................................... 475/230; 475/220
[58] Field of Search ............... 475/220, 230, 242, 221

[56] References Cited

U.S. PATENT DOCUMENTS

| 671,719 | 4/1901 | Coleman | 475/230 |
|---|---|---|---|
| 741,931 | 10/1903 | Sandell | 475/230 X |
| 2,200,153 | 5/1940 | Bush | 475/221 |
| 3,593,595 | 7/1971 | Taylor | 74/713 |
| 4,959,043 | 9/1990 | Klotz et al. | 475/220 X |

FOREIGN PATENT DOCUMENTS 979685 12/1975 Canada .................................. 475/230
7406325 5/1974 Fed. Rep. of Germany .

OTHER PUBLICATIONS

Machine Design Theory and Practice, Macmillan Publishing Co., pp. 806–807.
Mark's Standard Handbook For Mechanical Engineers, McGraw Hill, pp. 8-23, 25, 31.

Primary Examiner—Leslie A. Braun
Assistant Examiner—Ryan W. Massey
Attorney, Agent, or Firm—Cushman, Darby & Cushman

[57] ABSTRACT

A differential assembly for a vehicle comprises four pinions mounted on respective identical carrier pins mounted at 90° intervals in a carrier member. The pins are screwed into correspondingly screwed sockets tightened to a predetermined torque and locked in position by respective locking pins which engage undercuts formed in respective pins. Catastrophic failure due to single pin failure is thereby avoided.

4 Claims, 5 Drawing Sheets

DIFFERENTIAL ASSEMBLY

The present invention relates to a differential assembly.

Differential assemblies, particularly in the vehicle field, are well known. They enable the rear wheels of a rear wheel drive arrangement to rotate at differing speeds to accommodate the different path lengths the wheels travel over when the vehicle follows a curved path. The heart of such assemblies comprises a plurality of pinions through which power is transmitted between bevel wheels associated respectively with the two wheels. In some assemblies two pinions are provided but in order to achieve higher standards of quality and quiet operation and where high power is to be transmitted a four pinion assembly is preferable.

According to the present invention there is provided a differential assembly comprising a housing, four pinions rotatably mounted spaced from each other in the housing the rotatable mounting of each pinion being independent of other rotatable mountings.

In a preferred embodiment of the invention the four pinions are mounted on respective carrier pins. Each carrier pin is mounted by means of a screwed shank which is screwed into a complementary internally screwed bore in a carrier member which is centrally disposed within the housing. The carrier pins extend radially at 90° intervals from the carrier member. The radially outer end of each carrier pin is formed with a socket into which a tool may be inserted to screw that pin down into the carrier member. Each carrier pin is formed with an undercut and a locking pin is inserted through the carrier member to engage in the undercut after the pin is screwed into the carrier member to lock the carrier pin in that position.

BRIEF DESCRIPTION OF THE DRAWINGS

In order that the invention may be more clearly understood, one embodiment thereof will now be described, by way of example, with reference to the accompanying drawings, in which.

DESCRIPTION OF THE INVENTION

Figure 1:
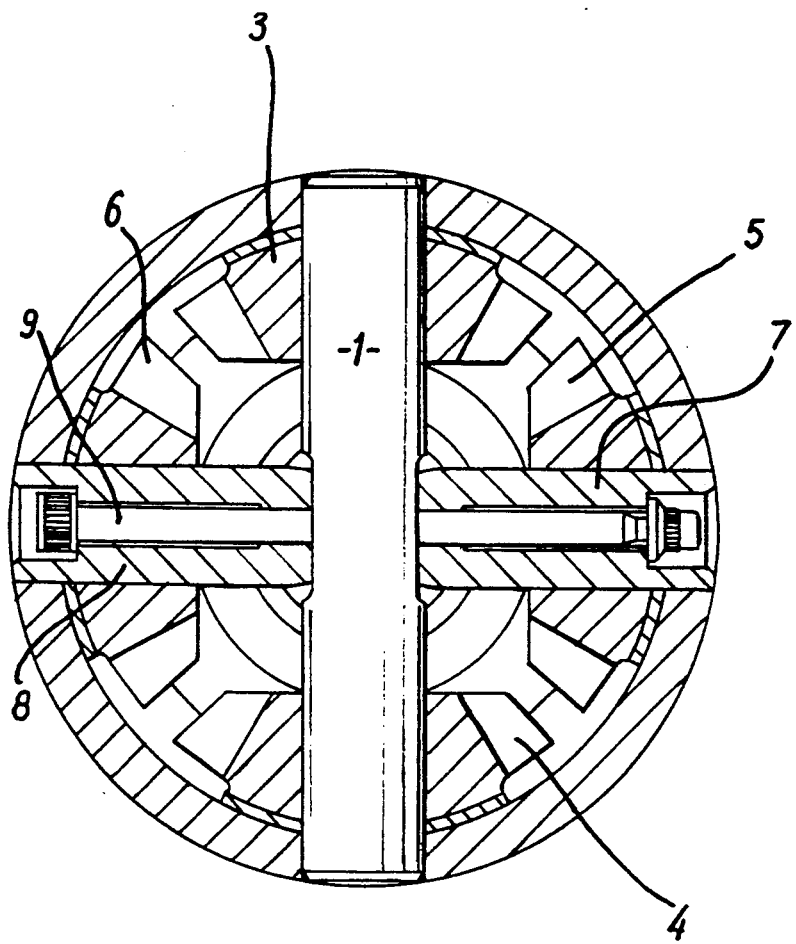
FIG. 1 shows a diagrammatic view in partial section of an existing differential assembly.

Referring to FIG. 1, a known differential assembly comprises a main pinion shaft 1 supported within a rotatable housing 2. Pinions 3, 4 are suitably mounted at opposite ends respectively thereof. A further two pinions 5, 6 are rotatably carried on distance pieces or bush members 7, 8 which are arranged on opposite sides respectively of the pinion shaft 1 and at right angles to that shaft. The assembly is locked together by means of screwed pin member and lock nut assembly 9. Under excessive loads the bush members 7, 8 can coggle in opposite directions which can place an excessive shear stress on the slender pin member 9. Failure of the single pin member 9 can result in catastrophic failure of the whole differential assembly.

Figure 2:
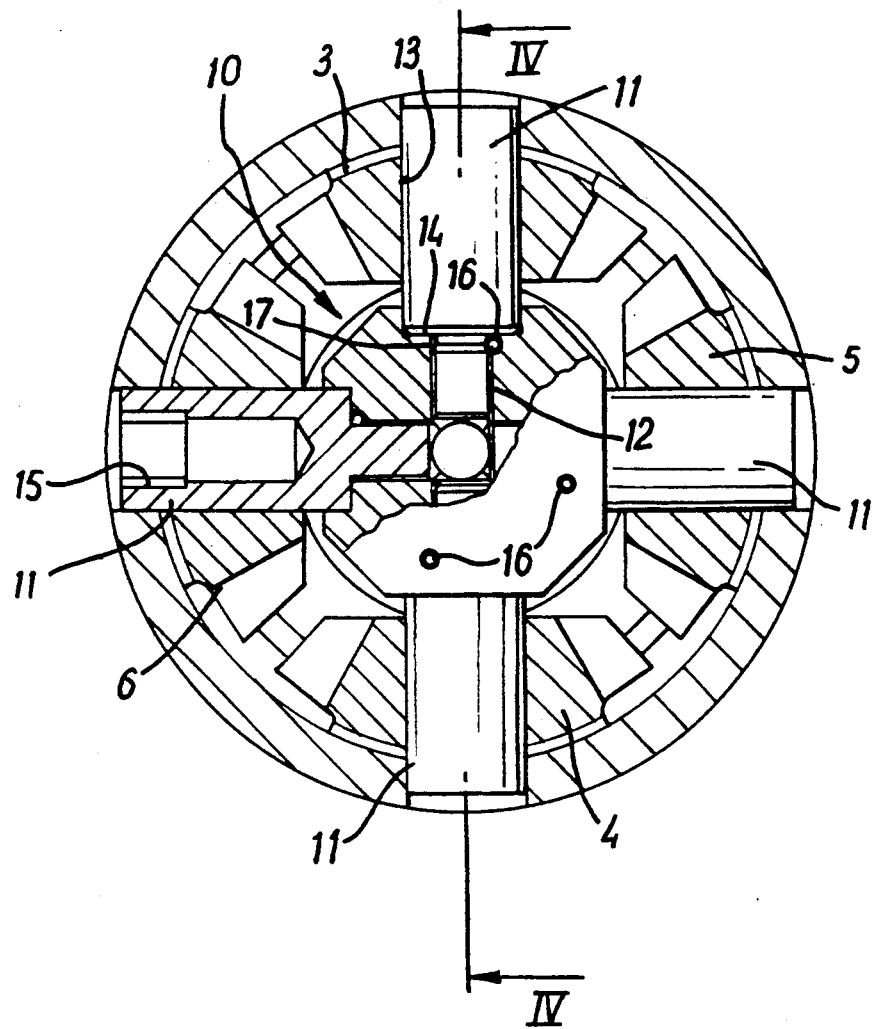
FIG. 2 shows a view similar to FIG. 1 but of an arrangement according to the invention.
Figure 3:
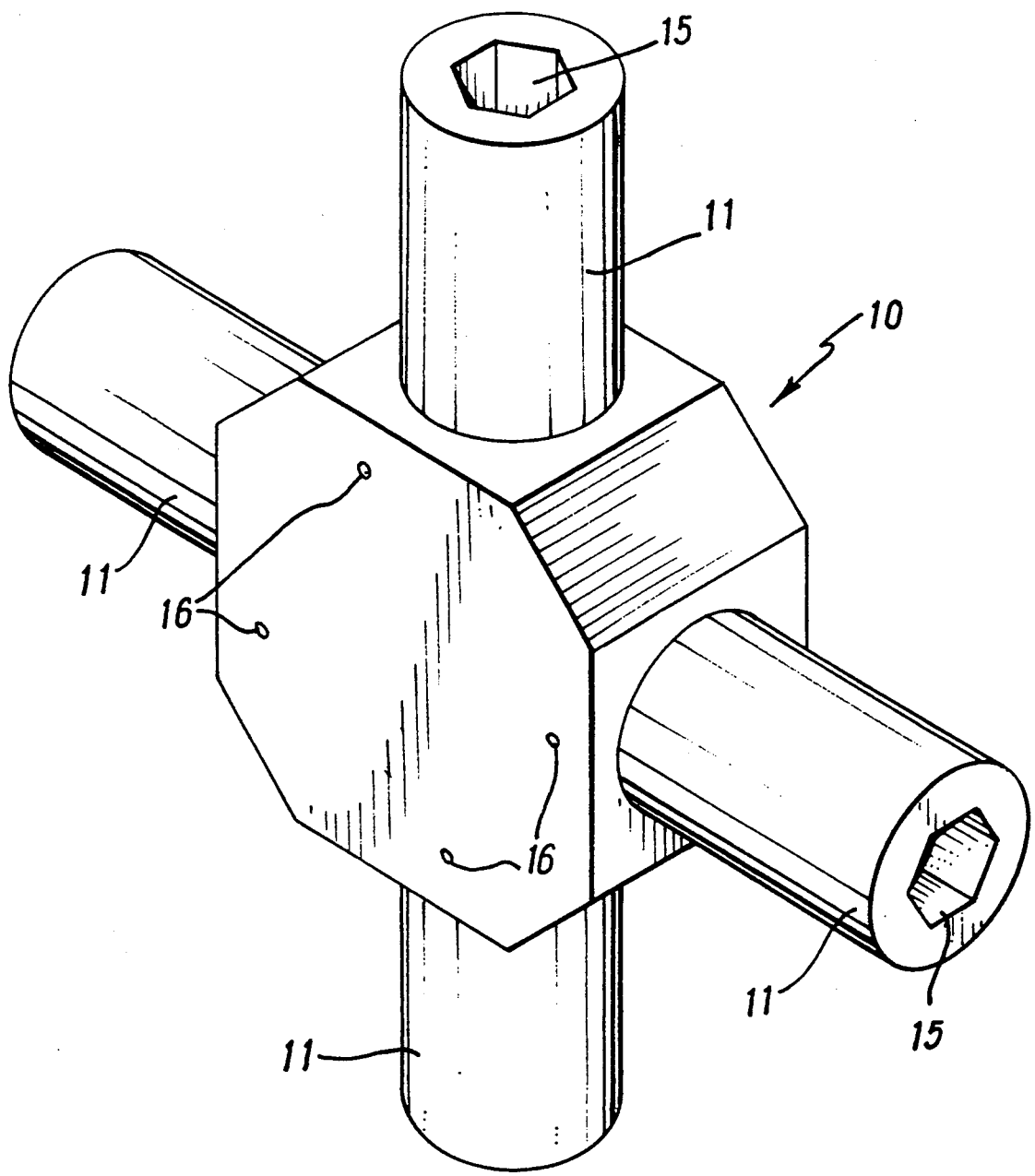
FIG. 3 shows an external perspective view of part of the arrangement of FIG. 2.
Figure 4:
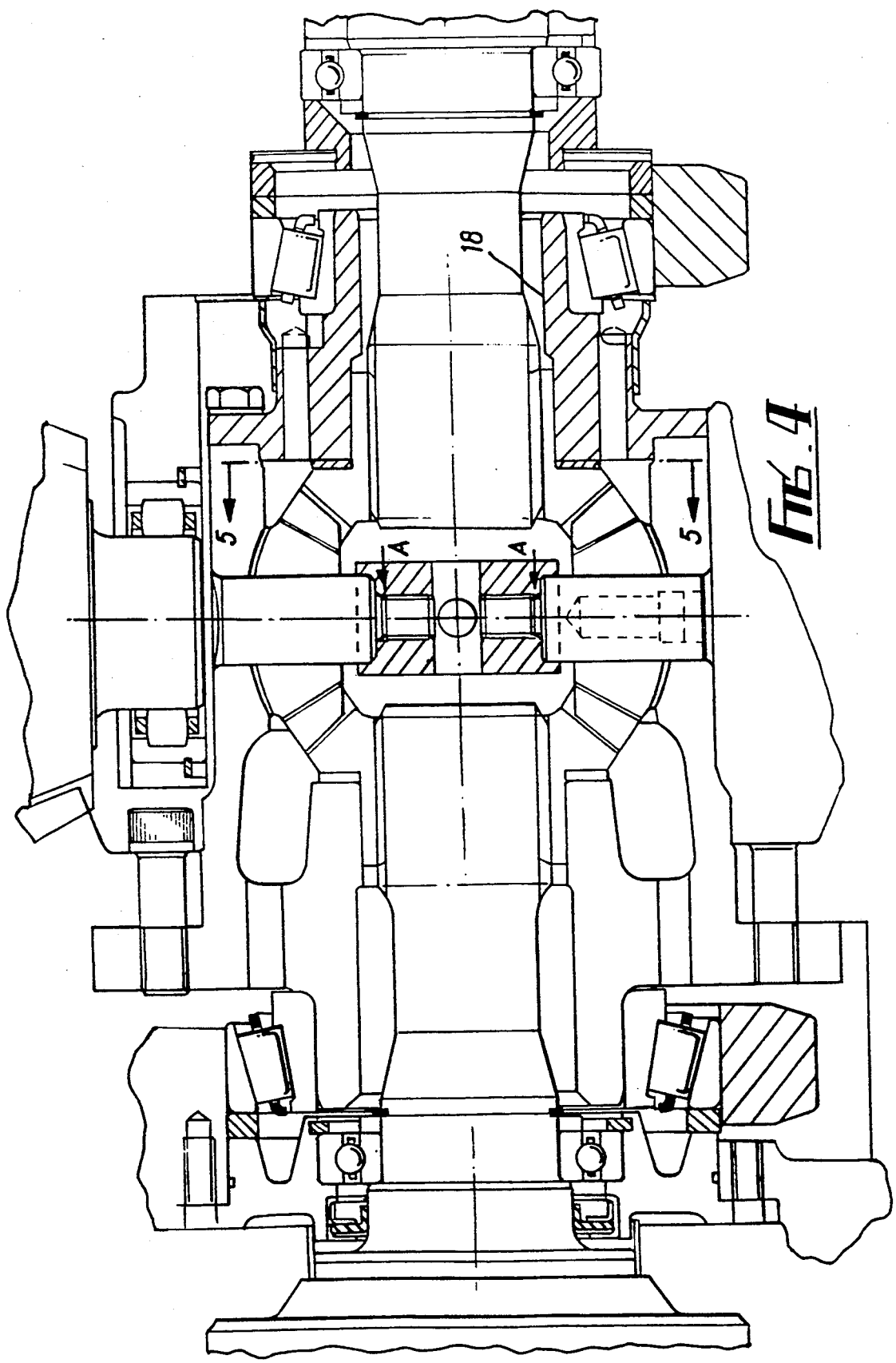
FIG. 4 is a sectional view taken along the line IV—IV of FIG. 2.
Figure 5:
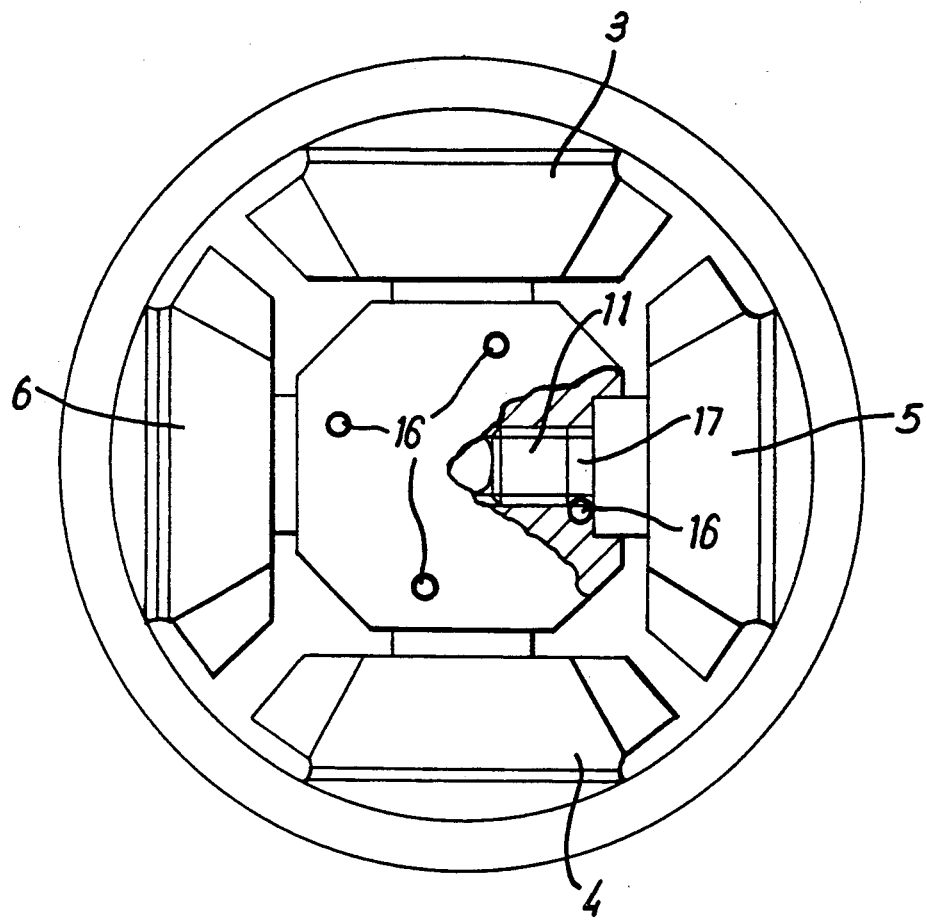
FIG. 5 is a simplified version of a diagrammatic view taken along the line 5—5 of FIG. 4.

Referring to FIG. 2, the differential assembly according to the invention comprises a carrier member 10 having mounted therein four separate identical carrier pins 11 disposed at 90° intervals. Each carrier pin 11 is mounted within carrier member 10 by means of a screwed shank 12 with the pin body 13 firmly abutting a shoulder 14 and the pins are a spigot fit in carrier member 10. The carrier pins are screwed down into correspondingly screwed sockets and tightened therein by means of a hexagonal tool inserted within hexagonal socket 15, best seen in perspective view of the carrier member 10 shown in FIG. 3. Once the carrier pins are screwed into their respective sockets and tightened to a predetermined torque, locking pins 16 are inserted through carrier member 10 to engage undercuts 17 formed in carrier pins 11. Thus a locking pin 16 is provided for each carrier pin so that potential catastrophic failure of the whole assembly due to the failure of a single component, as in the prior art arrangement, is prevented. Due to the complexity of the assembly the various components, pinions, carrier member and carrier pins have to be assembled in-situ and the final step of inserting locking pins 16 in the direction of arrow A, see FIG. 4, can only be done with end cover 18 (in heavy black lines, FIG. 4) removed.

An unexpected advantage of the new design is that because each carrier pin 11, four actually in number, is identical this is seen as a single component in the computerised inventory system. Consequently the number of components, actually more in number than the prior art assembly, is seen as a reduction in practice. Thus apart from the advantages flowing from the improved aspects of mechanical design there is this additional and unexpected advantage in inventory and component charges.

It should be noted that due to the complexity of production machinery and assembly the use of a carrier member in the shape of a solid cruciform shape is precluded.

It will be appreciated that the above embodiment has been described by way of example only and that many variations are possible without departing from the scope of the invention.

I claim:

1. A differential assembly comprising:
    a housing;
    a carrier member centrally disposed within the housing;
    four internally screwthreaded bores disposed in the carrier member;
    four carrier pins, each of said carrier pins having an undercut and a screwthreaded shank complementary to a said respective screwthreaded bore in the carrier member and being screwed into a said respective bore, thereby mounting the carrier pin;
    four pinions, each of said pinions being rotatably mounted on a respective carrier pin; and
    four locking pins, each of said locking pins being inserted through the carrier member to engage the undercut of a respective carrier pin after the pin is screwed into the carrier member to lock the carrier pin in position.

2. A differential assembly as claimed in claim 1, in which the carrier pins extend radially at 90° intervals from the carrier member.

3. A differential assembly as claimed in claim 2, in which the radially outer end of each carrier pin is formed with a socket into which a tool may be inserted to screw that pin down into the carrier member.

4. A differential assembly as claimed in claim 1, in which the radially outer end of each carrier pin is formed with a socket into which a tool may be inserted to screw that pin down into the carrier member.

* * * * *